US012756550B2

(12) United States Patent
Luo et al.

(10) Patent No.: US 12,756,550 B2
(45) Date of Patent: Oct. 6, 2026

(54) TIMESTAMP GENERATION METHOD AND APPARATUS, AND ELECTRONIC DEVICE AND STORAGE MEDIUM

(71) Applicants: ELECTRIC POWER RESEARCH INSTITUTE, CHINA SOUTHERN POWER GRID, Guangzhou (CN); GUIZHOU POWER GRID CO., LTD., Guiyang (CN)

(72) Inventors: Yi Luo, Guangzhou (CN); Jiaxiang Ou, Guiyang (CN); Bin Qian, Guangzhou (CN); Houpeng Hu, Guiyang (CN); Yong Xiao, Guangzhou (CN); Yanhong Xiao, Guiyang (CN); Ji Wang, Guangzhou (CN); Pengcheng Li, Guiyang (CN); Mi Zhou, Guangzhou (CN); Tianqiang Dong, Guiyang (CN); Fan Zhang, Guangzhou (CN); Xin Wu, Guiyang (CN); Fusheng Li, Guangzhou (CN); Zhenghao Gao, Guiyang (CN); Xiaoming Lin, Guangzhou (CN); Hangfeng Li, Guiyang (CN); Jianlin Tang, Guangzhou (CN); Zilong Ran, Guiyang (CN); Xuan Luo, Guiyang (CN); Wei Zhou, Guiyang (CN); Yaodan Deng, Guiyang (CN)

(73) Assignees: ELECTRIC POWER RESEARCH INSTITUTE, CHINA SOUTHERN POWERR GRID, Guangzhou (CN); GUIZHOU POWER GRID CO., LTD., Guiyang (CN)

( * ) Notice: Subject to any disclaimer, the term of this patent is extended or adjusted under 35 U.S.C. 154(b) by 149 days.

(21) Appl. No.: 18/560,691

(22) PCT Filed: Sep. 2, 2022

(86) PCT No.: PCT/CN2022/116772
§ 371 (c)(1),
(2) Date: Nov. 14, 2023

(87) PCT Pub. No.: WO2023/184858
PCT Pub. Date: Oct. 5, 2023

(65) Prior Publication Data
US 2024/0259196 A1 Aug. 1, 2024

(30) Foreign Application Priority Data
Mar. 31, 2022 (CN) ......................... 202210333295.9

(51) Int. Cl.
*H04L 9/08* (2006.01)
*H04L 9/00* (2022.01)
(Continued)

(52) U.S. Cl.
CPC ................ *H04L 9/088* (2013.01); *H04L 9/30* (2013.01); *H04L 9/3236* (2013.01);
(Continued)

(58) Field of Classification Search
CPC ......... H04L 9/088; H04L 9/30; H04L 9/3236; H04L 9/3247; H04L 9/3297; H04L 9/50
See application file for complete search history.

(56) References Cited

U.S. PATENT DOCUMENTS

2020/0051069 A1* 2/2020 Wilson .................. H04L 9/3236
2020/0076625 A1* 3/2020 Kass ................... G06F 16/1834
(Continued)

FOREIGN PATENT DOCUMENTS

CN 110800253 A 2/2020
CN 112202558 A 1/2021
(Continued)

OTHER PUBLICATIONS

Y. Zhang, C. Xu, H. Li, H. Yang and X. Shen, "Chronos: Secure and Accurate Time-Stamping Scheme for Digital Files via Blockchain," ICC 2019—2019 IEEE International Conference on Communications (ICC), Shanghai, China, 2019, pp. 1-6 (Year: 2019).*
(Continued)

*Primary Examiner* — Jeremy S Duffield
(74) *Attorney, Agent, or Firm* — Yue (Robert) Xu; Apex Attorneys at Law, LLP

(57) ABSTRACT

A timestamp generation method and apparatus, and an electronic device and a storage medium, which are used for solving the technical problem of recorded information being easily leaked because a trusted third party is usually needed as a timestamp authority for recording in a traditional trusted timestamp generation method. In the present invention, the method comprises: acquiring a file record; calculating a hash value of the file record; sending the hash value to a random issuer, and receiving a signature result returned by the
(Continued)

random issuer, wherein the signature result is generated after the random issuer signs the hash value and a receiving time, and the receiving time is the time when the random issuer receives the hash value; and storing the signature result in a blockchain as a timestamp of the file record.

9 Claims, 3 Drawing Sheets

(51) Int. Cl.
*H04L 9/30* (2006.01)
*H04L 9/32* (2006.01)

(52) U.S. Cl.
CPC .......... *H04L 9/3247* (2013.01); *H04L 9/3297* (2013.01); *H04L 9/50* (2022.05)

(56) References Cited

U.S. PATENT DOCUMENTS

| | | | | |
|---|---|---|---|---|
| 2020/0127860 | A1* | 4/2020 | Aschauer | H04L 9/3236 |
| 2020/0169425 | A1* | 5/2020 | Hofstee | H04L 9/0861 |
| 2020/0334773 | A1* | 10/2020 | Spangenberg | G06Q 50/184 |
| 2021/0166220 | A1* | 6/2021 | Kano | G06Q 20/3672 |
| 2021/0272108 | A1* | 9/2021 | Jing | G06Q 20/3829 |
| 2022/0129443 | A1* | 4/2022 | Nadeau | G06F 21/64 |
| 2023/0259640 | A1* | 8/2023 | Metzler | G06F 21/6218 713/191 |
| 2023/0261886 | A1* | 8/2023 | Ha | H04L 63/18 713/176 |

FOREIGN PATENT DOCUMENTS

| | | | |
|---|---|---|---|
| CN | 112651052 | A | 4/2021 |
| CN | 113810453 | A | 12/2021 |
| CN | 114726536 | A | 7/2022 |
| JP | 2007335957 | A | 12/2007 |

OTHER PUBLICATIONS

International Search Report for PCT/CN2022/116772 mailed Jan. 5, 2023, ISA/CN.

Zhang Shuai, Research on Trusted Time Stamp Service System Based on Authentication, Chinese Master 's Theses Full-Text Database, Aug. 15, 2016.

* cited by examiner

TIMESTAMP GENERATION METHOD AND APPARATUS, AND ELECTRONIC DEVICE AND STORAGE MEDIUM

The present application is a national phase application of PCT international patent application PCT/CN2022/116772, filed on Sep. 2, 2022 which claims priority to Chinese Patent Application No. 202210333295.9, titled "METHOD AND APPARATUS FOR GENERATING TIMESTAMP, ELECTRONIC DEVICE AND STORAGE MEDIUM", filed on Mar. 31, 2022 with the China National Intellectual Property Administration, both of which are incorporated herein by reference in their entireties.

FIELD

The present disclosure relates to the technical field of blockchains, and in particular to a method and an apparatus for generating a timestamp, an electronic device and a storage medium.

BACKGROUND

Internet of Energy, as a new type of a smart grid, aims at addressing environmental issues by using more renewable energy and using energy more effectively. The Internet of Energy system involves untrusted participants from a large-scale distributed power generation system, a storage system, users and the like. Therefore, how to provide a trusted timestamp service in such smart grid becomes a hot topic. For example, an energy provider is required to prove that he/she transferred some energy to a consumer at a time instant.

A trusted timestamp may be used to prove the existence of some files before a time instant without the possibility that an owner can backdate or update the files. Therefore, the trusted timestamp may be a way to prove that an event occurs between some participants at a time instant in the Internet of Energy.

However, in the conventional trusted timestamp solution, a trusted third party usually acts as a timestamping authority for a record. Due to the decentralized untrusted participants in the Internet of Energy, the conventional trusted timestamp solution in which a central service provider (that is equivalent to the trusted third party) is provided is not applicable to the Internet of Energy.

SUMMARY

A method and an apparatus for generating a timestamp, an electronic device and a storage medium are provided according to the present disclosure, to solve the technical problem that record information is easily disclosed in the conventional method for generating a trusted timestamp resulted from that a trusted third party usually acts as a timestamping authority for a record.

A method for generating a timestamp is provided according to the present disclosure. The method includes: obtaining a file record; calculating a hash value of the file record; sending the hash value to a random signer, and receiving a signature result returned by the random signer, where the signature result is generated in a case that the random signer signs the hash value and a receiving time instant, and the receiving time instant is a time instant when the random signer receives the hash value; and storing the signature result in a blockchain as a timestamp of the file record.

In an embodiment, the storing the signature result in a blockchain as a timestamp includes: obtaining a symmetric key; encrypting the file record by using the symmetric key to obtain ciphertext of the file record; and storing the ciphertext and the timestamp in the blockchain through a preset smart contract.

In an embodiment, the method further includes: obtaining, on receipt of a verification request for the timestamp from a verifier, record information corresponding to the timestamp; and obtaining a public key of the file record, and verifying the record information by using the file record and the public key.

In an embodiment, the record information includes an error code, a digital signature, the ciphertext, block time in the blockchain and the symmetric key.

An apparatus for generating a timestamp is further provided according to the present disclosure. The apparatus includes an obtaining module, a hash value calculating module, a signature result obtaining module and a storage module. The obtaining module is configured to obtain a file record. The hash value calculating module is configured to calculate a hash value of the file record. The signature-result obtaining module is configured to send the hash value to a random signer, and receive a signature result returned by the random signer, where the signature result is generated in a case that the random signer signs the hash value and a receiving time instant, and the receiving time instant is a time instant when the random signer receives the hash value. The storage module is configured to store the signature result in a blockchain as a timestamp of the file record.

In an embodiment, the storage module includes: a symmetric key obtaining sub-module, a ciphertext obtaining sub-module, and a storage sub-module. The symmetric key obtaining sub-module is configured to obtain a symmetric key. The ciphertext obtaining sub-module is configured to encrypt the file record by using the symmetric key to obtain ciphertext of the file record. The storage sub-module is configured to store the ciphertext and the timestamp in the blockchain through a preset smart contract.

In an embodiment, the apparatus further includes a record information obtaining sub-module and a verification sub-module. The record information obtaining sub-module is configured to obtain, on receipt of a verification request for the timestamp from a verifier, record information corresponding to the timestamp. The verification sub-module is configured to obtain a public key of the file record, and verify the record information by using the file record and the public key.

In an embodiment, the record information includes an error code, a digital signature, the ciphertext, block time in the blockchain and the symmetric key.

An electronic device is further provided according to the present disclosure. The device includes a processor and a memory. The memory is configured to store program codes and transmit the program codes to the processor. The processor is configured to perform the method for generating a timestamp described above according to instructions in the program codes.

A computer-readable storage medium is further provided according to the present disclosure. The computer-readable storage medium stores program codes. The program codes are used to perform the method for generating a timestamp described above.

It can be seen from the above technical solutions that the present disclosure has the following advantages. In the present disclosure, the file record is obtained, the hash value of the file record is calculated, the hash value is sent to the random signer, and the signature result returned by the random signer is received. The signature result is generated in a case that the random signer signs the hash value and the receiving time instant. The receiving time instant is a time instant when the signer receives the hash value. The signature result is stored in the blockchain as the timestamp of the file record, providing security during generation of the timestamp of the file record. In addition, the trusted third party is unnecessary.

BRIEF DESCRIPTION OF THE DRAWINGS

In order to more clearly illustrate technical solutions in the embodiments of the present disclosure or in the conventional technology, drawings to be used in the description of the embodiments or the conventional technology are briefly introduced hereinafter. It is apparent that the drawings described below show only the embodiments of the present disclosure, and other drawings may be obtained by those skilled in the art from the drawings without any creative work.

DETAILED DESCRIPTION OF THE EMBODIMENTS

A method and an apparatus for generating a timestamp, an electronic device and a storage medium are provided according to embodiments of the present disclosure, to solve the technical problem that record information is easily disclosed in the conventional method for generating a trusted timestamp resulted from that a trusted third party usually acts as a timestamping authority for a record.

In order to make the objectives, features and advantages of the present disclosure clearer and easier to be understood, technical solutions in the embodiments of the present disclosure are described clearly and completely below in conjunction with the drawings of the embodiments of the present disclosure. Apparently, the embodiments described below are only some embodiments of the present disclosure, rather than all the embodiments. Any other embodiments obtained by those skilled in the art based on the embodiments in the present disclosure without any creative effort fall within the protection scope of the present disclosure.

Figure 1:
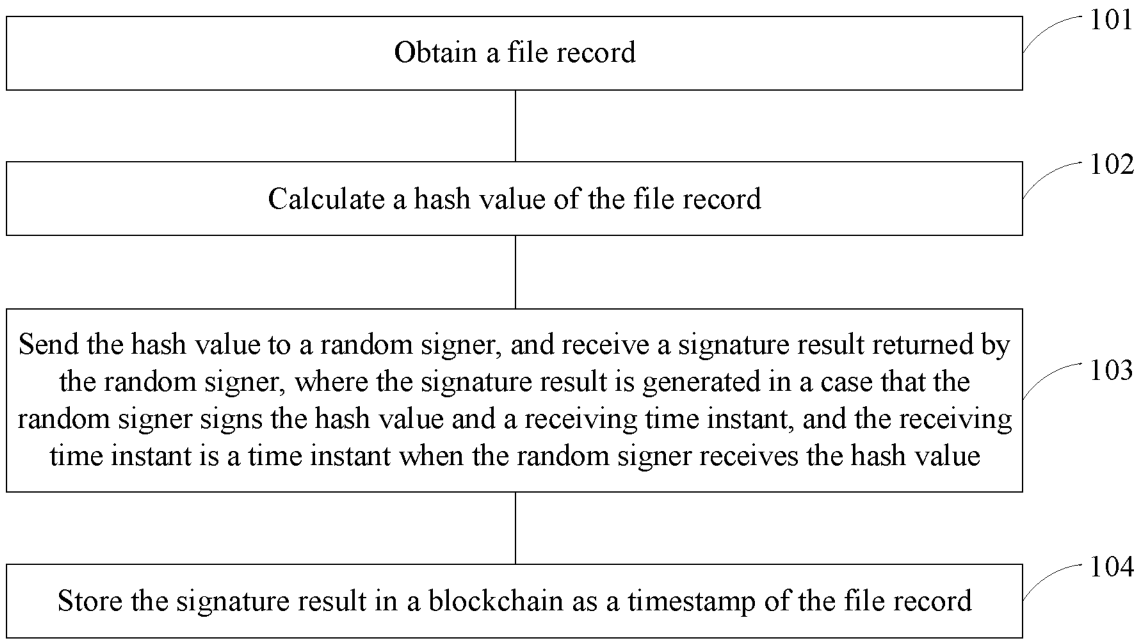
FIG. 1 is a flowchart showing overall steps of a method for generating a timestamp according to an embodiment of the present disclosure.

Reference is made to FIG. 1, which is a flowchart showing overall steps of a method for generating a timestamp according to an embodiment of the present disclosure.

The method for generating a timestamp according to the present disclosure may include the following steps 101 to 104.

In step 101, a file record is obtained.

In step 102, a hash value of the file record is calculated.

When a user wants to apply for a timestamping certificate for the obtained file record (for example, a power consumption record of a consumer), a hash value of the file record may be calculated first by using a Hash algorithm and the hash value serves as a random number.

In step 103, the hash value is sent to a random signer, and a signature result returned by the random signer is received. The signature result is generated in a case that the random signer signs the hash value and a receiving time instant. The receiving time instant is a time instant when the random signer receives the hash value.

In step 104, the signature result is stored in a blockchain as a timestamp of the file record.

After the hash value of the file record is calculated, the hash value may be sent to a random signer that is randomly obtained by using an algorithm. On receipt of the hash value sent by the user, the random signer adds a receiving time instant when the hash value is received to the end of the hash value, then signs the hash value and the receiving time instant as a whole to generate the signature result, and returns the signature result to the user. The user stores the signature result as a timestamp. During the above operations, a data structure is formed and stored in the blockchain, so that the file record with the timestamp is stored in the blockchain.

In the present disclosure, the file record is obtained, the hash value of the file record is calculated, the hash value is sent to the random signer, and the signature result returned by the random signer is received. The signature result is generated in a case that the random signer signs the hash value and the receiving time instant. The receiving time instant is the time instant when the signer receives the hash value. The signature result is stored in the blockchain as the timestamp of the file record, providing security during the generation of the timestamp of the file record.

Figure 2:
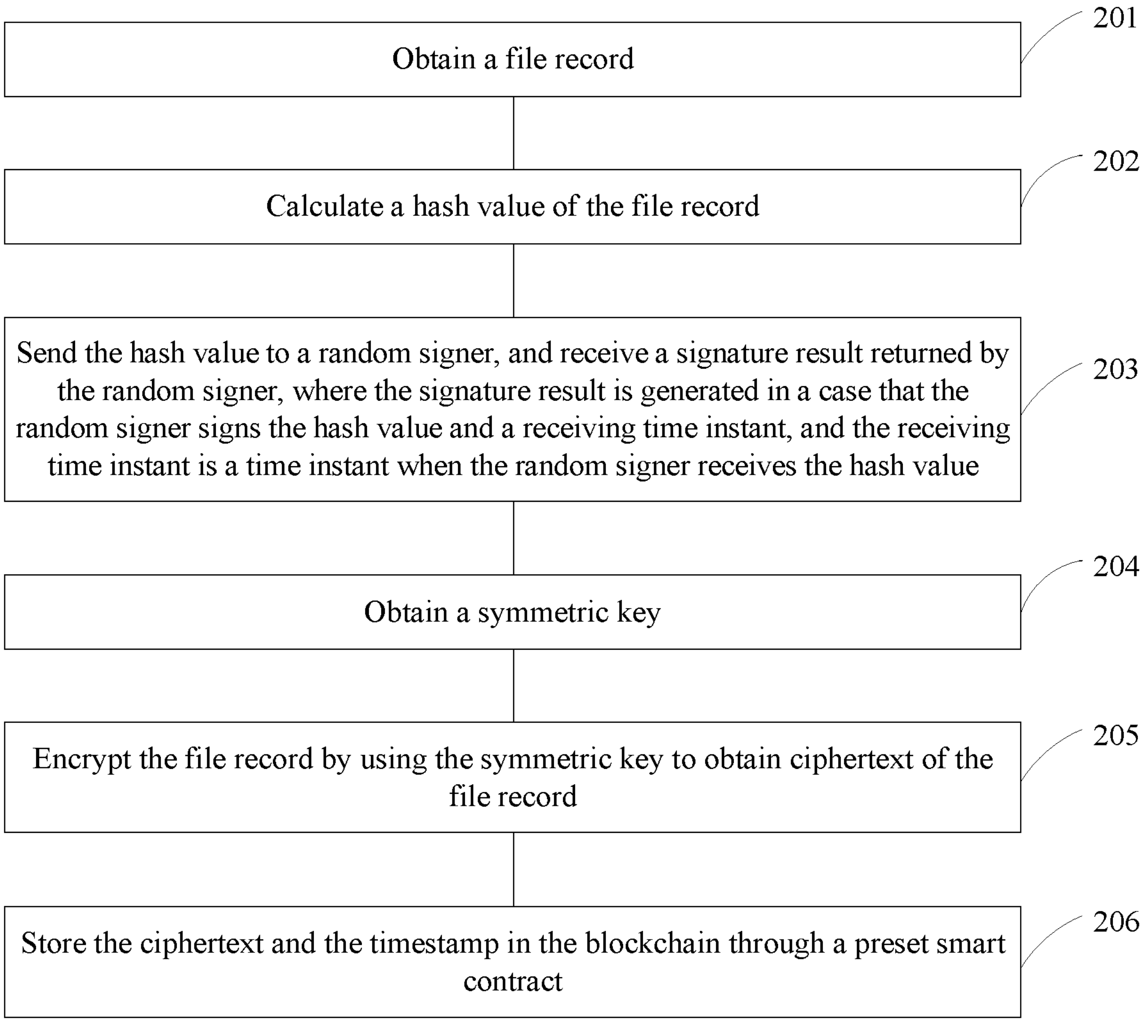
FIG. 2 is a flowchart showing detailed steps of a method for generating a timestamp according to an embodiment of the present disclosure.

Reference is made to FIG. 2, which is a flowchart showing detailed steps of a method for generating a timestamp according to an embodiment of the present disclosure. The method may include the following steps 201 to 206.

In step 201, a file record is obtained.

In step 202, a hash value of the file record is calculated.

In the embodiment of the present disclosure, before the timestamp of the file record is generated, a hash value H=SHA256(record) of the file record for generating the timestamp is first calculated. SHA256 is a basic cryptographic hash algorithm.

In step 203, the hash value is sent to a random signer, and a signature result returned by the random signer is received. The signature result is generated in a case that the random signer signs the hash value and a receiving time instant. The receiving time instant is a time instant when the random signer receives the hash value.

The hash value is sent to the random signer after the hash value is obtained. The random signer may generate a digital signature sign=ECDSA.Sign(H, SK) by using an asymmetric key SK, where the digital signature is formed by the hash value H and the asymmetric key SK, so as to obtain the signature result of the file record. The ECDSA.Sign is performed by using a basic cryptographic signature solution ECDSA and calling a signature algorithm Sign in the ECDSA.

An ECDSA (Elliptic Curve Digital Signature Algorithm) is a simulation of a digital signature algorithm (DSA) by using elliptic curve cryptography (ECC).

It should be noted that the above asymmetric key is configured when the user registers and joins a blockchain system by using a system initialization algorithm InitialParams. By using the algorithm, a system administrator provides the user with function system initialization to generate a pair of keys (PK, SK). The PK is made public, while the private key SK is kept secret by the user. In detail, in this algorithm, an elliptic curve secp256k1 is first selected, and the pair of keys (PK, SK) is generated by using a key generation algorithm in the ECDSA, as shown in the following algorithm 1. ECDSA.GenerateKeyPair is performed by using the basic cryptographic signature solution ECDSA and calling the key generation algorithm GenerateKeyPair in the ECDSA.
Algorithm 1

```
InitialParams
Input (accountld)
Output (PK, SK)
1:   (PK, SK)=ECDSA.GenerateKeyPair(accountId, secp256k1)
2:   Publish(accountId, PK);
3: Return (PK, SK)
```

In addition, in a case that the user cancels the operations and logs out of the system, the system administrator may update the public key and the private key of the user to be 0, which indicates that the keys of the user are unavailable.

In step 204, a symmetric key is obtained.

In step 205, the file record is encrypted by using the symmetric key to obtain ciphertext of the file record.

In step 206, the ciphertext and the timestamp are stored in the blockchain through a preset smart contract.

After the signature result is generated, a one-time symmetric key k may be generated for performing an encryption operation AES.Enc (record, k) on the file record. The encryption operation AES.Enc is performed by using a basic cryptographic symmetric solution AES and calling an encryption algorithm Enc in the AES. Finally, the smart contract is called. Through an addS (H, E, Sig) operation, the timestamp is packaged into the blockchain together with transaction and the timestamp is stored in a block of the blockchain. E represents the ciphertext of the file record.

In implementation of the embodiments of the present disclosure, a data structure (records) of the file record stored in Ethereum may be constructed as shown in the following Table 1. "owner" represents address information of a data owner in the blockchain. "digest" represents the hash value of the record. "signature" represents a signature during a transaction in the blockchain. "cipher" represents an encryption result of the hash value of the record. "timestamp" represents an effective time instant of the record. The effective time instant and a height of a current block in the blockchain are in one-to-one correspondence. "timestamp" represents a time instant (that is a time instant when the current block of the blockchain is generated), and is the core of implementing a timestamp service. "k" represents a key of a symmetric cryptographic solution.

TABLE 1

| Data type | Data description |
|---|---|
| address | owner |
| string | digest |
| string | signature |
| string | cipher |
| uint | timestamp |
| string | k |

The timestamp may be generated by using an algorithm AddStamp (as shown in the following algorithm 2). First, a one-time key k including 32 bytes is generated, and the file record is encrypted by using an encryption algorithm in the standard AES. For example, the file record is encrypted by using an AES-256-cbc version of the encryption algorithm (where a random number iv including 16 bytes is generated in the use of the version). Then, the hash value H of the file record is calculated and a digital signature Sig of the hash value is created. Finally, (H, E, Sig) is added to the blockchain by calling an algorithm AddS in the smart contract.
Algorithm 2

```
AddStamp
Input (Record, SK)
Output (H)
1: k=randomBytes (32);
2: iv=randomBytes (16);
3: E=AES.Enc(Record, k||iv);
4: H=SHA256 (Record);
5: Sig=ECDSA.Sign (H, SK);
6: if AddS (H, E, Sig)==True then
7: Return H
8: end if
```

In the algorithm AddStamp, the called algorithm AddS is an algorithm in the smart contract, and details of the algorithm are shown in the following algorithm 3. First, it is determined whether data in "timestamp" recorded in the blockchain is equal to 0. In a case that the data is equal to 0, it indicates that there is no available block in the blockchain and the transaction fails, and the algorithm returns False. In a case that the data is not equal to 0, the algorithm allocates a sender address of the transaction and information (including the hash value, the signature, the ciphertext, and the like) of the file record obtained through the cryptographic solution to each data in the data structure of the file record. msg.sender in the algorithm 3 represents the sender address of the transaction in the blockchain.
Algorithm 3

```
AddS
Input (H, E, Sig)
Output Ture or False
1: if records[H].timestamp=0 then
2: Return False
3: else
4: records[H].owner=msg.sender;
5: records[H].digest=H;
6:   records [H].signature=Sig;
7:   records [H].cipher=E;
8:   records [H].timestamp=block.timestamp;
9: end if
10: Return Ture
```

Further, once the AddS (H, E, Sig) operation is confirmed by the Ethereum blockchain, it indicates that the file record with a timestamp have been published to a block in the blockchain. In order to verify the timestamp, the symmetric key k is outputted and published to the blockchain by using an algorithm UnlockS (H, k) in the smart contract. A verifier may decrypt the file record by using the symmetric key to verify the timestamp.

In implementation, the algorithm UnlockS is the algorithm in the smart contract in the blockchain as shown in the following algorithm 4. The algorithm UnlockS is used to package the symmetric key k in the file record into the data structure of the file record in the blockchain, so as to verify the timestamp. Before the blockchain confirms the information (H, E, Sig), plaintext of the file record is unknown except for the owner, and validity of the timestamp of the file record can be verified (that is, whether have a same one-time symmetric key k). In the algorithm, it is first determined whether an address of the data owner is the same as the sender address of the transaction. In a case that the address of the data owner is the same as the sender address of the transaction, the file record is 0, or a data section "k" in the file record is 0, it indicates that the timestamp is invalid, and the algorithm ends. Otherwise, the algorithm returns data in the data section "k" in the file record as information of verifying the timestamp.

Therefore, content of the file record is encrypted by using the AES, and the key k is not disclosed by the owner until the blockchain network confirms the transaction of the operation. It is difficult for any attacker in the blockchain network to forge the file record unless the original file record has been confirmed by the blockchain network. Once the original file record is confirmed by the blockchain network, the one-time symmetric key k is written into the data structure of the file record in the block and cannot be tampered with, thereby ensuring strong security.

Algorithm 4

```
UnlockStamp
Input (H)
Output k
1: if records[H].owner=msg.sender or
records[H].k=0 or records[H]=0 then
2: Return
3: else
4: k=records[H].k;
5: end if
6: Return k
```

In the embodiment of the present disclosure, the method further includes: obtaining, on receipt of a verification request for the timestamp from a verifier, record information corresponding to the timestamp; and obtaining a public key of the file record, and verifying the record information by using the file record and the public key.

The record information includes an error code, a digital signature, the ciphertext, a block time in the blockchain and the symmetric key.

In practice, a verifier may verify the file record with the timestamp in the blockchain. For example, an energy supplier creates a timestamp of an electricity consumption record for a consumer, and the record is related to providing electricity to the consumer. The generated timestamp of the record may be submitted to the consumer for verification. In a case that the timestamp is valid, the consumer recognizes the consumption record and pays for the consumption. When a verifier wants to verify a record with a timestamp, information of the record is first obtained by calling a VerifyS(H) algorithm in the smart contract. The VerifyS(H) algorithm returns a tuple (R, Sig, E, T, k), where R represents an error code. In a case that R is not equal to zero, it indicates that an error occurs and the record does not exist. Sig represents a digital signature of the record. E represents ciphertext of the record. T represents a block time in the blockchain for recording the packaged timestamp. k represents a symmetric key for encrypting/decrypting the record. In a case that an error is found, (Sig, E, T, k) are set to 0. After obtaining the tuple (R, Sig, E, T, k), the verifier may decrypt the ciphertext by using AES.Dec(E, k) to obtain plaintext D of the record. AED.Dec is performed by using the basic cryptographic symmetric solution AES and calling a decryption algorithm Dec in the AES. Finally, the validity of the timestamp is verified by using ECDSA. Verify (PK, Sig, H(D)). H(D) represents a hash value obtained by performing the hash algorithm SHA256 on the plaintext D once. The operation ECDSA. Verifys is performed by using the basic cryptographic signature solution ECDSA and calling a signature verification algorithm Verify in the ECDSA. In the algorithm, (PK, Sig) is inputted, H'(D) is obtained through calculation and verification, and it is determined whether the timestamp is valid by comparing H'(D) with H(D). That is, the timestamp is valid in a case that H'(D) is equal to H(D).

Details of a timestamp verification algorithm are as shown in the following algorithm 5. Before the algorithm is used, the data owner provides the verifier with the original record and the public key corresponding to the original record, that is, (record, PK). Then, the timestamp verification algorithm calls an algorithm CheckS in the smart contract to obtain record information, including (R, Sig, E, T, kliv). Based on the record information, the ciphertext of the record is decrypted and then the validity of the signature is verified. The algorithm determines whether R is equal to 0. In a case that R is not equal to 0, it indicates that an error is found, and the algorithm returns False. In a case that R is equal to 0, the algorithm decrypts the ciphertext E and marks the ciphertext as P. In a case that P is different from data of the original record, or the hash value H is different from a result obtained by performing the hash algorithm SHA256 on the original record, it is determined that the record is illegal, and the algorithm returns False. In a case that there is no return operation in the previous determinations, the algorithm finally calls a verification algorithm ECDSA. Verify(PK, Sig, H) in the ECDSA, and returns a result of the verification algorithm ECDSA. Verify(PK, Sig, H) as a result of verifying the timestamp.

Algorithm 5

```
VerifyStamp
Input (H, Record, PK)
Output Ture or False
1: [R, Sig, E, T, k||iv]=CheckS(H);
2: if R!= 0 then
3: Return False
4: else
5: P=AES.Dec (E, k||iv);
6: if P!= Record or H!=SHA256(Record) then
7: return False
8: end if
9: Return ECDSA.verify (PK, Sig, H)
10: end if
```

The algorithm CheckS in a line indicated by 1 in the algorithm 5 is an algorithm in the smart contract, and details of the algorithm CheckS are as shown in algorithm 6. First, it is determined whether data in the "timestamp" recorded in the blockchain is equal to 0. In a case that the data is equal to 0, it indicates that there is no available block in the blockchain and the transaction fails, and the algorithm returns (100, 0, 0, 0, 0), that is, an error occurs, and all data information in the data structure of the record is set to 0. In a case that the timestamp is not equal to 0, the algorithm allocates the sender address of the transaction and the information of the record obtained through the cryptographic solution to each data in the data structure of the record. Finally, the algorithm returns the data information (R, Sig, E, T, k) in the data structure of the record.

Algorithm 6

```
CheckS
Input (H)
Output (R, Sig, E, T, k)
1: if records [H].timestamp=0 then
2: Return (100, 0, 0, 0, 0)
3: else
4: records[H].digest=R;
5:records[H].signature=Sig;
6:    records[H].cipher=E;
7:    records[H].timestamp==T;
```

-continued

```
8:   records[H].k=k;
9: end if
10: Return (R, Sig, E, T, k)
```

In the present disclosure, the file record is obtained, the hash value of the file record is calculated, the hash value is sent to the random signer, and the signature result returned by the random signer is received. The signature result is generated in a case that the random signer signs the hash value and the receiving time instant. The receiving time instant is a time instant when the random signer receives the hash value. The signature result is stored in the blockchain as the timestamp of the file record, providing security during generation of the timestamp of the file record.

Figure 3:
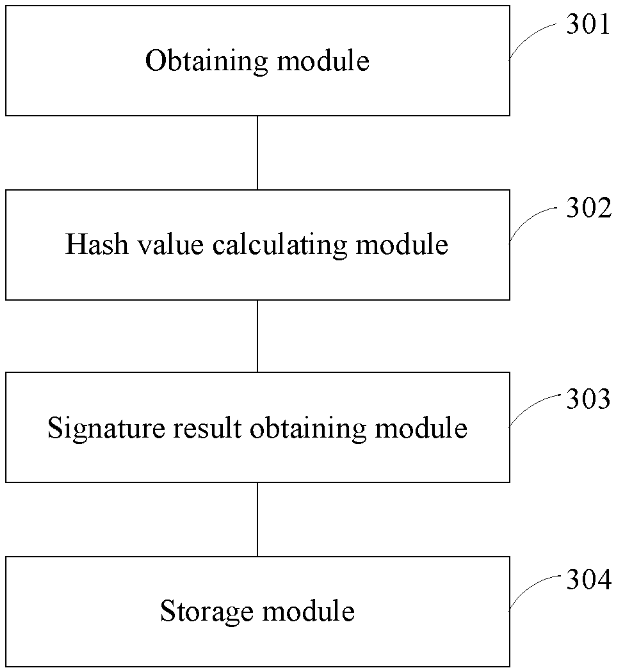
FIG. 3 is a structural block diagram of an apparatus for generating a timestamp according to an embodiment of the present disclosure.

Reference is made to FIG. 3, which is a structural block diagram of an apparatus for generating a timestamp according to an embodiment of the present disclosure.

An apparatus for generating a timestamp is provided according to an embodiment of the present disclosure. The apparatus includes an obtaining module 301, a hash value calculating module 302, a signature result obtaining module 303, and a storage module 304.

The obtaining module 301 is configured to obtain a file record.

The hash value calculating module 302 is configured to calculate a hash value of the file record.

The signature result obtaining module 303 is configured to send the hash value to a random signer, and receive a signature result returned by the random signer. The signature result is generated in a case that the random signer signs the hash value and a receiving time instant. The receiving time instant is a time instant when the random signer receives the hash value.

The storage module 304 is configured to store the signature result in a blockchain as a timestamp of the file record.

In an embodiment of the present disclosure, the storage module includes a symmetric key obtaining sub-module, a ciphertext obtaining sub-module, and a storage sub-module.

The symmetric key obtaining sub-module is configured to obtain a symmetric key.

The ciphertext obtaining sub-module is configured to encrypt the file record by using the symmetric key to obtain ciphertext of the file record.

The storage sub-module is configured to store the ciphertext and the timestamp in the blockchain through a preset smart contract.

In an embodiment of the present disclosure, the apparatus further includes a record information obtaining sub-module and a verification sub-module.

The record-information obtaining sub-module is configured to obtain, on receipt of a verification request for the timestamp from a verifier, record information corresponding to the timestamp.

The verification sub-module is configured to obtain a public key of the file record, and verify the record information by using the file record and the public key.

In an embodiment of the present disclosure, the record information includes: an error code, a digital signature, the ciphertext, block time in the blockchain and the symmetric key.

An electronic device is further provided according to an embodiment of the present disclosure. The device includes a processor and a memory.

The memory is configured to store program codes and transmit the program codes to the processor.

The processor is configured to perform the method for generating a timestamp according to the embodiments of the present disclosure according to instructions in the program codes.

A computer-readable storage medium is further provided according to an embodiment of the present disclosure. The computer-readable storage medium stores program codes. The program codes are used to perform the method for generating a timestamp according to the embodiments of the present disclosure.

Those skilled in the art can clearly understand that, for ease and simplicity of description, reference may be made to the foregoing method embodiments for operation processes of the system, apparatus and units, which are not repeated here.

The above embodiments in the specification are described in a progressive manner. Each of the embodiments is mainly focused on describing the differences from other embodiments, and reference may be made among these embodiments with respect to the same or similar parts.

Those skilled in the art should understand that the embodiments of the present disclosure may be provided as a method, an apparatus, or a computer program product. Therefore, the embodiments of the present disclosure may be implemented in a form of full hardware embodiments, full software embodiments, or embodiments combining software and hardware. Further, the embodiments of the present disclosure may be implemented in a form of a computer program product implemented on one or more computer-usable storage media (including but not limited to a disk memory, a CD-ROM, an optical memory and the like) including computer-executable program codes.

The embodiments of the present disclosure are described with reference to flowcharts and/or block diagrams of the method, the terminal device (the system) and the computer program product according to the embodiments of the present disclosure. It should be understood that each flow and/or block in the flowcharts and/or block diagrams and a combination of a flow and/or a block in the flowcharts and/or block diagrams may be implemented by computer program instructions. The computer program instructions may be provided to a general computer, a dedicated computer, an embedded processor or processors of other programmable data processing terminal devices to generate a machine, such that the instructions executed by the computer or the processors of the other programmable data processing terminal devices generate an apparatus for implementing functions specified in one or more flows in the flowcharts and/or one or more blocks in the block diagrams.

The computer program instructions may also be stored in a computer-readable memory which can guide the computer or other programmable data processing terminal devices to operate in a specific manner, such that the instructions stored in the computer-readable memory generate a product including an instruction apparatus which implements functions specified in one or more flows in the flowcharts and/or one or more blocks in the block diagrams.

The computer program instructions may also be loaded onto the computer or other programmable data processing terminal devices, so that the computer or the other programmable data processing terminal device performs a series of operations to perform computer-implemented processing. Thus, instructions executed on the computer or the other programmable terminal devices provide steps for implementing functions specified in one or more flows in the flowcharts and/or one or more blocks in the block diagrams.

Although preferred embodiments of the present disclosure are described, those skilled in the art can make variations and modifications to these embodiments once they know the basic inventive concept. Therefore, the claims are intended to be interpreted as including the preferred embodiments and all variations and modifications falling within the scope of the embodiments of the present disclosure.

Finally, it should be further noted that the relationship terms herein such as “first”, “second” and the like are only used to distinguish one entity or operation from another entity or operation, rather than necessitate or imply that any such actual relationship or order exists between these entities or operations. In addition, terms “include”, “comprise” or any other variants thereof are intended to encompass a non-exclusive inclusion. Therefore, a process, a method, an article or a terminal device including a series of elements includes not only those elements but further other elements that are not enumerated, or further include the elements inherent in the process, the method, the article or the terminal device. Unless expressively limited otherwise, the statement “comprising/including a(n) . . . ” does not exclude the case that other similar elements may exist in the process, the method, the article or the terminal device other than enumerated elements.

In summary, the above embodiments are only for illustrating the technical solutions of the present disclosure, and are not intended to limit the present disclosure. Although the present disclosure is illustrated in detail with reference to the embodiments described above, it should be understood by those skilled in the art that modification can be made to the technical solutions recited in the embodiments described above, or equivalent substitutions can be made to a part of technical features of the technical solution. The modifications and equivalent substitutions do not make the corresponding technical solutions deviate from the spirit and the scope of the technical solutions of the embodiments of the present disclosure.

The invention claimed is:

1. A method for generating a timestamp, comprising:

obtaining a file record;

calculating a hash value of the file record;

sending the hash value to a random signer, and receiving a signature result returned by the random signer, wherein the signature result is generated in a case that the random signer signs the hash value and a receiving time instant, and the receiving time instant is a time instant when the random signer receives the hash value;

determining whether an address of a data owner is the same as a sender address of a transaction;

storing, in response to the address of the data owner being different from the sender address of the transaction, the file record being not 0, or a data section k in the file record being not 0, a symmetric key for performing an encryption operation on the file record into a blockchain; and storing the signature result in the blockchain as a timestamp of the file record;

wherein the symmetric key is a one-time symmetric key and is written into a data structure of the file record in a block; and the timestamp and a height of the block in the blockchain are in one-to-one correspondence.

2. The method according to claim 1, wherein the storing the signature result in a blockchain as a timestamp of the file record comprises:

obtaining the symmetric key;

encrypting the file record by using the symmetric key to obtain ciphertext of the file record; and storing the ciphertext and the timestamp in the blockchain through a preset smart contract.

3. The method according to claim 2, further comprising:

obtaining, on receipt of a verification request for the timestamp from a verifier, record information corresponding to the timestamp; and obtaining a public key of the file record, and verifying the record information by using the file record and the public key.

4. The method according to claim 3, wherein the record information comprises an error code, the signature result, the ciphertext, block time in the blockchain and the symmetric key.

5. An apparatus for generating a timestamp, comprising: a processor and a memory, wherein the memory is configured to store program codes and transmit the program codes to the processor; and the processor is configured to perform:

obtaining a file record;

calculating a hash value of the file record;

sending the hash value to a random signer, and receiving a signature result returned by the random signer, wherein the signature result is generated in a case that the random signer signs the hash value and a receiving time instant, and the receiving time instant is a time instant when the random signer receives the hash value;

determining whether an address of a data owner is the same as a sender address of a transaction;

storing, in response to the address of the data owner being different from the sender address of the transaction, the file record being not 0, or a data section k in the file record being not 0, a symmetric key for performing an encryption operation on the file record into a blockchain; and storing the signature result in the blockchain as a timestamp of the file record;

wherein the symmetric key is a one-time symmetric key and is written into a data structure of the file record in a block; and the timestamp and a height of the block in the blockchain are in one-to-one correspondence.

6. The apparatus according to claim 5, wherein the processor is further configured to perform:

obtaining the symmetric key;

encrypting the file record by using the symmetric key to obtain ciphertext of the file record; and storing the ciphertext and the timestamp in the blockchain through a preset smart contract.

7. The apparatus according to claim 6, the processor is further configured to perform:

obtaining, on receipt of a verification request for the timestamp from a verifier, record information corresponding to the timestamp; and obtaining a public key of the file record, and verifying the record information by using the file record and the public key.

8. The apparatus according to claim 7, wherein the record information comprises an error code, the signature result, the ciphertext, block time in the blockchain and the symmetric key.

9. A non-transitory computer-readable storage medium, storing program codes, wherein the program codes are used to perform the method for generating a timestamp according to claim 1.

* * * * *